March 6, 1956  J. EISLER  2,737,618
MINIATURE RECTIFIER
Filed Nov. 17, 1952

INVENTOR.
JACK EISLER,
BY D. Gordon Angus
ATTORNEY.

United States Patent Office 2,737,618
Patented Mar. 6, 1956

2,737,618
MINIATURE RECTIFIER

Jack Eisler, Los Angeles, Calif., assignor to International Rectifier Corporation, El Segundo, Calif., a corporation of California Application November 17, 1952, Serial No. 320,907

10 Claims. (Cl. 317—234)

This invention relates to semi-conductor dry plate electric elements and more particularly to such elements of a very small or miniature size.

Selenium rectifiers are well known. They ordinarily comprise a base plate coated with a layer of crystalline selenium over which there is a counterelectrode layer. The base plate serves as one terminal of the rectifier and the counterelectrode as the other terminal. A selenium rectifier is well known as a dry plate rectifier of the type which utilizes a crystalline semi-conductor material as an active substance in the rectifying of electric current.

Although such rectifiers in large size are used to handle substantial amounts of current and power, they are also useful in very small sizes for handling very small amounts of current and power. Such small size rectifiers or diodes are useful with instruments; and it is to such diodes that the present invention is directed.

An object of the present invention is to provide a simple and inexpensive rectifier assembly useful as a miniature diode.

The invention is carried out by an assembly of one or more miniature rectifying elements with terminal leads securely held in contact with the terminal members, the assembly being held in a sleeve or tube of sufficient resilience or stretch to maintain tight electrical contact of the parts. A feature resides in the assembly being embedded in a solid envelope of insulating material.

The foregoing and other features of the invention will be better understood from the following detailed description and the accompanying drawing of which:

Figure 1:
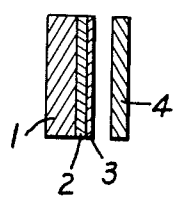
Fig. 1 is a side view in section showing parts of a rectifier element used in this invention.

Referring to the drawings, Fig. 1 shows the relationship of component elements used in assembling the rectifier arrangement. Plate 1 is a base plate of an electrical conducting material ordinarily metal which may be a ferrous metal or the like, preferably aluminum, which may have its surface roughened to help hold the selenium. This base plate can be of any convenient shape, but will ordinarily be a circular disc which may be for example about 1/8 inch or 1/16 inch in diameter and may be in the order of about .01 inch to .05 inch thick, a good thickness being about .03 inch.

A layer of selenium 2 is made adherent to the surface of the base plate 1; and it can be applied in any suitable manner of which several are known in the art, needing no detailed description here. A common way is to apply amorphous selenium to the surface, and then crystallize it by an annealing treatment. A convenient way to do this is to spread the amorphous selenium in powder form over the surface of a relatively large sheet of the base plate metal which may conveniently be nickel plated on a roughened surface on which the selenium is to be spread. This is pressed against the base plate by placing a smooth surface pressure plate over the powdered selenium and pressing at a pressure which may be in the order of one thousand pounds per square inch and at a temperature of about 125° to 130° C. for a couple of minutes or more. This is a customary treatment, and as is well known, it will sinter the selenium particles causing them to coalesce and to adhere to the base plate as a layer which will be much thinner than is indicated in Fig. 1 which is shown disproportionately thick for the purpose of illustration. An annealing treatment is then given the selenium which can be done by heating it for a time, for example about a half-hour or an hour, at a temperature just under the melting point of selenium, for example around 217° C. Although the foregoing explanation has been given as a brief outline of one way of obtaining a crystallized layer on the base plate, the particular manner of obtaining such a selenium layer on the base plate is not of consequence with respect to the present invention.

The crystallized selenium coating adherent to the base plate then has applied to it a counterelectrode layer 3 which is a thin layer of an electrical conducting material, such as an alloy of cadium and bismuth which can be used in about equal proportions by weight, usually applied by spraying in molten form over the selenium surface. If desired, there can be used any of the variously known expedients for improving the barrier layer by which the rectifying action occurs at the interface between the selenium and the counterelectrode; and since such expedients are no part of the present invention, none are described here.

The selenium rectifier elements consisting of layers 1, 2 and 3 can be punched out in the proper size from the larger plate prepared as noted above. Such miniature elements having the layers 1, 2 and 3 are herein called "selenium elements." Such a selenium element is well-known as a dry plate semi-conductor element which utilizes a crystalline semi-conductor material as an active substance in the rectifying of an electric current.

It will be understood that the selenium elements consisting of layers 1, 2 and 3 could if desired be prepared in some other manner than that just described which is merely given by way of illustration. It will also be understood that any desired additives may be put into the selenium to improve the properties, in a well known manner.

The disc 4 shown somewhat separated from the counterelectrode in Fig. 1 is simply an electrical contacting member, ordinarily metal, used to make contact over the surface of the counterelectrode 3. This can conveniently be a disc of brass or the like of the same diameter as the base plate and may be in the order of about .01 inch thick.

Figure 2:
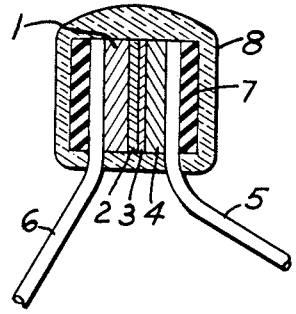
Fig. 2 is a side view in section showing a rectifier assembly using the parts shown in Fig. 1, in accordance with this invention.
Figure 3:
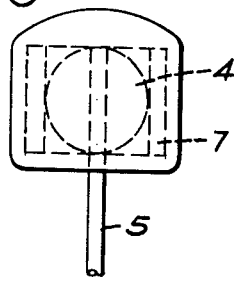
Fig. 3 is an end view of the assembly of Fig. 2.

In assembling the rectifier the contactor 4 will have its surface brought against the counterelectrode surface as shown in Fig. 2 and a pair of electrical leads 5 and 6, which may be flexible copper wires, ordinarily of smaller diameter than that of the discs, will be brought into contact with the outside surfaces of the contacting disc 4 and the base plate 1, respectively, as shown in Figs. 2 and 3.

This assembly is held firmly together by a sleeve or tubing of an insulating material. The sleeving should have some stretchability and resilience so as to create a force compacting the discs together and holding the leads 5 and 6 into firm contact with their respective discs. Suitable sleeving is nylon tubing or vinylite or spun glass sleeving or some other similar thin walled flexible insulating material capable of being stretched over the assembly. Of these, nylon is preferred for its inexpensiveness, stretchability and ease of use.

The assembly of the sleeving with the elements within it is then embedded in a rigid block or bead 8 preferably of a solidified plastic material or the like. This can be done by dipping the assembly into a container of the embedding material in its liquid form. For this purpose, the embedding material may be any material having good insulating properties and which can exist in a liquid form at a temperature not too high to injure the elements and which will then solidify after embedding the elements and remain solid at ordinary temperatures of use, with great enough strength to insure firmly holding the assembly together.

A suitable thermosetting material is that sold as "Epon 828" by Shell Chemical Corporation, Emeryville, California, which is a styrene-polyester type of resin. Another substance which can be used for the purpose is that known as "Hysol 6020" which is an epoxide base resin supplied by the Houghton Laboratories, 322 Bush Street, Olean, New York.

Although thermosetting types of resins are preferred for the reason that they are more apt to have the required physical properties noted above, it should be understood that thermoplastic types of resins could be used instead if they have the desired physical properties. Thermoplastic type resins, of course, tend to soften at higher temperatures; and it is required that whatever resin is used shall not soften at too low a temperature; otherwise its strength would be lost and it would no longer hold the assembly together. A thermoplastic resin could be used if it does not soften below about 100° C. and has sufficient strength to hold the assembly. Furthermore, where a thermosetting type of resin is used, the heat used to produce the setting or solidification should be held below about 100° C. in order not to injure the parts of the assembly which might be injured by higher temperatures. Temperatures as high as about 125° to 150° C., for example, might tend to soften the counterelectrode material or the selenium.

It should be understood that the particular resin or other material used for embedding the components is not of paramount importance. The principal consideration is the selection of a material having the requisite physical and dielectric characteristics noted above.

Figure 5:
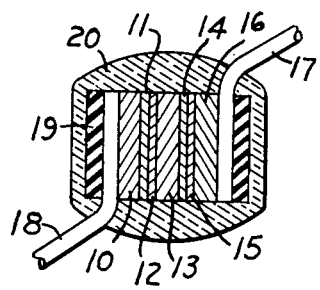
Fig. 5 is a side view in section showing another form of rectifier assembly according to this invention.
Figure 4:
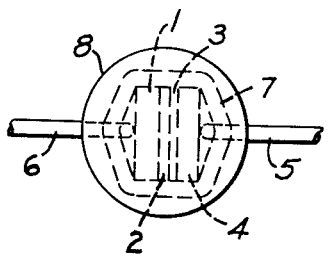
Fig. 4 is a top view of the rectifier of Figs. 2 and 3.

Fig. 5 shows another form of rectifier similar to that of Figs. 2 to 4 in which more than a single selenium element is used. In Fig. 5 two elements like that of Fig. 1 are used in series. Thus, the first element comprises the base plate 10 with the selenium layer 11 and the counterelectrode layer 12; and the second element comprises the base plate 13 with the selenium layer 14 and the counterelectrode layer 15. The disc 16 is the contacting disc over the counterelectrode 15 and corresponds to the disc 4 of Figs. 1 to 4. The terminal leads 17 and 18 may be similar to the leads 5 and 6 of Figs. 2 to 4. The principal difference being that leads 17 and 18 are brought out from opposite ends of the sleeve 19. The envelope 20 may be of similar material to that of the envelope 8 in Figs. 2 to 4.

It will be recognized that more than two selenium elements may be used if desired, simply by placing the surface of the base plate uncoated by selenium, of each succeeding element against the counterelectrode of the preceding element, as in Fig. 5.

The rectifiers made in accordance with this invention can be extremely small in size, occupying practically no space, and due to their small size and light weight they are easily supported in any position from their extending lead wires, which can be suitably soldered or attached to terminal positions on a panel or chassis.

After the rectifier is assembled, it should be electroformed to develop its barrier layer and make it act as a rectifier. This is a well known process, ordinarily involving the application of an alternating voltage across the rectifier, preferably in series with some resistance. For example, an A. C. voltage in the order of around 6 volts in series with the rectifier element and about a 15 ohm resistance will serve the purpose. After unidirectional current is observed to flow through the rectifier, the rectifier is ready for use. This is a well known process needing no further discussion here.

I claim:

1. A miniature rectifier comprising the assembly of the following components: a selenium coated base plate with a counterelectrode over the selenium, a contacting plate in contact with the counterelectrode, a terminal lead in contact with the face of the base plate opposite the selenium layer and a second terminal lead in contact with the face of the contacting plate opposite the counterelectrode; a sleeve of stretchable insulating material around said assembly, said sleeve compressing the components together, and a solid insulating envelope embedding and holding together the assembly and the sleeve, said terminal leads protruding from the envelope.

2. A miniature rectifier comprising the assembly of at least one selenium element having two electrical terminal surfaces, a terminal lead individually in contact with each of said terminal surfaces; a sleeve of stretchable insulating material around said assembly, said sleeve compressing the components together, and a solid insulating envelope embedding and holding together the assembly and the sleeve, said terminal leads protruding from the envelope.

3. A rectifier according to claim 2 in which the envelope is of plastic material.

4. A rectifier according to claim 2 in which the envelope is of thermosetting plastic material.

5. A rectifier according to claim 2 in which the envelope is of a polyester-styrene resin.

6. A rectifier according to claim 2 in which the selenium element is a disc.

7. A miniature rectifier comprising the assembly of a plurality of selenium elements each element having a base plate and counterelectrode constituting the two respective terminals of the element, the base plate of one element being against the counterelectrode of the next, and a contacting element covering the counterelectrode of the selenium element remote from any base plate, a terminal lead in contact with said contacting element, and another terminal lead in contact with the base plate of the element which is not in contact with any counterelectrode, a sleeve of stretchable insulating material around said assembly, said sleeve compressing the components of the assembly together, and a solid insulating envelope embedding and holding together the assembly and the sleeve, said terminal leads protruding from the envelope.

8. A miniature rectifier comprising the assembly of the following components: a base plate, a layer of semiconductor material coating said base plate, a counterelectrode over the semi-conductor material, a contacting plate in contact with the counterelectrode, a terminal lead in contact with the face of the base plate opposite the semi-conductor material, and a second terminal lead in contact with the face of the contacting plate opposite the counterelectrode; a sleeve of stretchable insulating material around said assembly, said sleeve compressing the components together, and a solid insulating envelope embedding and holding together the assembly and the sleeve, said terminal leads protruding from the envelope.

9. A miniature rectifier comprising the assembly of at least one dry plate semi-conductor element having two electrical terminal surfaces, a terminal lead individually in contact with each of said terminal surfaces; a sleeve of stretchable insulating material around said assembly, said sleeve compressing the components together, and a solid insulating envelope embedding and holding together the assembly and the sleeve, said terminal leads protruding from the envelope.

10. A miniature rectifier comprising the assembly of a plurality of dry plate semi-conductor elements, each element having a base plate and counterelectrode constituting the two respective terminals of the element, the base plate of one element being against the counterelectrode of the next, and a contacting element covering the counterelectrode of the dry plate semi-conductor element remote from any base plate, a terminal lead in contact with said contacting element, and another terminal lead in contact with the base plate of the element which is not in contact with any counterelectrode, a sleeve of stretchable insulating material around said assembly, said sleeve compressing the components of the assembly together, and a solid insulating envelope embedding and holding together the assembly and the sleeve, said terminal leads protruding from the envelope.

References Cited in the file of this patent

UNITED STATES PATENTS

| | | |
|---|---|---|
| 1,891,345 | Davidson | Dec. 20, 1932 |
| 2,359,801 | Skinker | Oct. 10, 1944 |
| 2,463,565 | Ruben | Mar. 8, 1949 |

FOREIGN PATENTS

| | | |
|---|---|---|
| 435,964 | Great Britain | Oct. 2, 1935 |
| 482,363 | Great Britain | Mar. 24, 1938 |